Nov. 1, 1927.　　　　　　　　　　　　　　　　1,647,375
M. C. SKAGGS ET AL
RADIUS ROD BRACE
Filed June 25, 1924
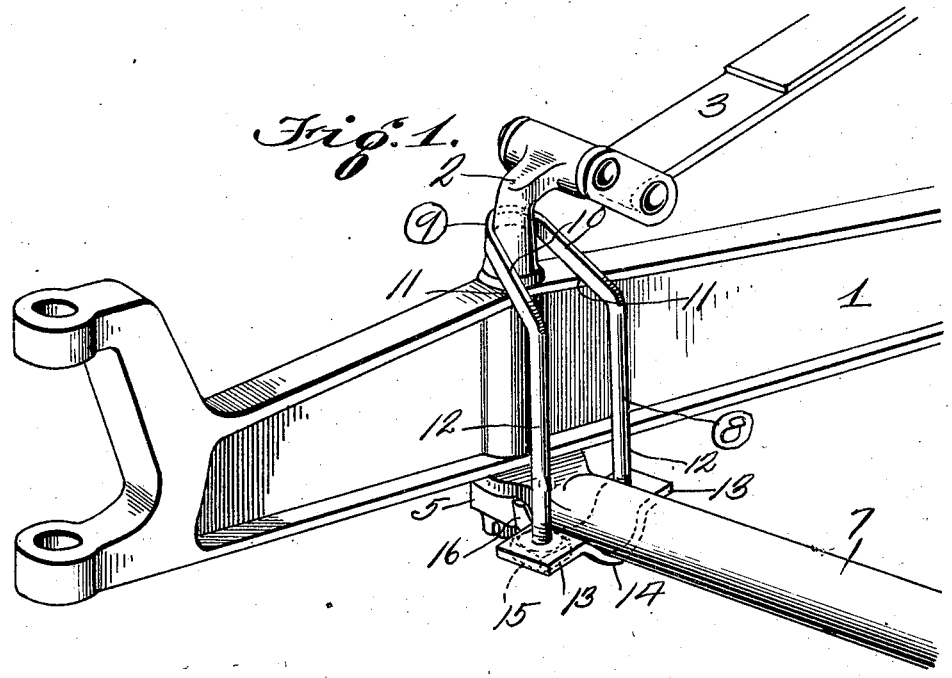
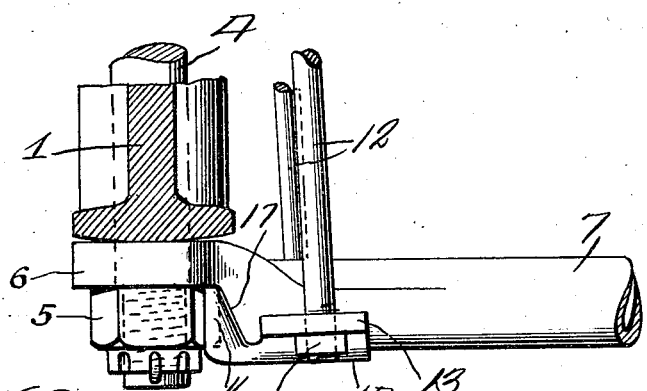
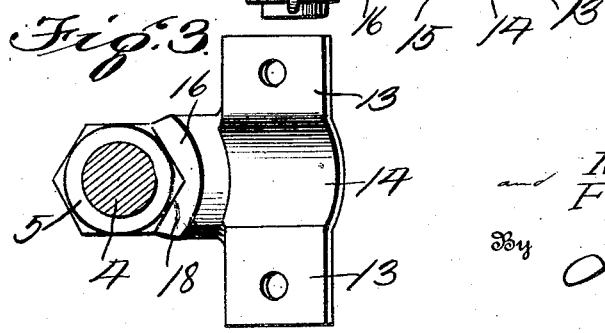
Inventors
M. C. Skaggs
F. Hammock
By D. Swift
Attorney Patented Nov. 1, 1927.

1,647,375

UNITED STATES PATENT OFFICE.

MERT C. SKAGGS AND FLOYD HAMMOCK, OF CROCKER, MISSOURI.

RADIUS-ROD BRACE.

Application filed June 25, 1924. Serial No. 722,283.

The invention relates to radius rod braces for automobile running gear, and has for its object to provide a device of this character which will positively hold the forward end of the radius rod to the under side of the axle, brace the spring perch, and prevent the perch nut from becoming loose on the under side of radius rod, thereby preventing the radius rod from becoming loose.

A further object is to provide a radius rod brace comprising a looped member extending over the perch above the axle of the automobile and having its arm extending downwardly at opposite sides of the radius rod and through ears of a plate engaging the under side of the radius rod, and nuts threaded on said arms. Also to provide the plate with an upwardly extending flange interposed between the forward end of the radius rod and the perch nut, and forming means for preventing rotation of said perch nut.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1 is a perspective view of a portion of a conventional form of automobile axle showing the brace applied to the spring perch and radius rod.

Figure 2 is a detail sectional view through a portion of the axle showing the lock holding member carried by the brace.

Figure 3 is a top plan view of the radius rod engaging plate, showing the nut holding means carried thereby in engagement with the perch nut.

Referring to the drawing, the numeral 1 designates the front axle of a conventional form of automobile, which front axle is provided with a conventional form of spring perch 2, to which is secured one end of the spring 3 in the usual manner. The perch 2 is provided with a downwardly extending shaft 4 which extends through the axle 1 and has its lower end provided with a nut 5, which nut, when tightened, not only maintains the perch 2 rigidly in place, but securely holds the offset lugs 6 of the radius rod 7 in close engagement with the under side of the axle 1. It has been found that the radius rods 7 are easily bent incident to automobiles going over rough ground, at which time a rearward twisting action is imparted on the axle, and the nuts 5 easily work loose, allowing the development of play in the perch shaft 4 and the connection of the radius rods 7 with the axle, therefore under excessive driving strains the parts easily bend or twist. To obviate the above difficulty the brace 8 is primarily designed.

The brace 8 comprises a U-shaped portion 9 which extends around the perch 2 and has its arms 10 extending downwardly and rearwardly and preferably engage the upper rear edge of the axle 1 at 11. Arms 10 terminate in substantially vertically disposed portions 12 which extend downwardly at opposite sides of the radius rod 7 and through ears 13 of concave plates 14 which engage the undersides of the radius rod 7, therefore it will be seen that when the nuts 15 are tightened, the brace 8 will positively brace the perch 2 as well as the radius rod 7, especially when strains are applied thereto in the direction of the arrow $a$, Figure 2, consequently bending or twisting of the radius rod adjacent the lug 6 thereof is obviated as well as the radius rod braced as a whole. The forward side of the concaved plate 14 is provided with an upwardly extending transversely disposed tapered flange 16, which is interposed between the forward tapered end 17 of the radius rod and the nut 5 and provided with a V-shaped recess 18 in its forward face for the reception of one of the corners of the nut 5 as shown in Figure 3, therefore it will be seen that after the first nut 5 has been tightened on the perch shaft 4 and the plate 14 placed in position and attached to the brace, the flange 16 will positively hold the nut 5 against unscrewing and becoming loose, consequently play can not develop in the parts. The flange 16 and the plate 14 also maintain the brace arms 12 spaced from the axle 1 in positions where a positive bracing action will take place on on the radius rod 7.

From the above it will be seen that a radius rod brace is provided which is simple in construction, will positively brace the radius rod, one which may be easily and quickly applied to a conventional form of radius rod, axle and perch.

The invention having been set forth what is claimed as new and useful is:—

1. The combination with an automobile axle, a spring perch carried by the upper side of said axle, a shaft carried by said perch and extending downwardly through the axle, a nut on said shaft below the axle, a radius rod connected to said shaft between the under side of the axle and the nut, of a brace connecting said perch above the axle and the radius rod, said brace being U-shaped and having its transverse portion extending around one side of the perch, said U-shaped brace having its arms extending rearwardly and downwardly and terminating at opposite sides of the radius rod, a plate engaging the under side of the radius rod, and to which said arms are connected and means carried by said plate and cooperating with the nut for preventing rotation thereof.

2. The combination with an automobile axle, a spring perch carried by the upper side of said axle, a shaft carried by said perch and extending downwardly through the axle, a nut carried by said shaft, a radius rod, an upwardly offset portion carried by said radius rod and interposed between the nut and the axle, of a brace for said radius rod, said brace comprising a U-shaped member extending around the perch, a plate engaging the underside of the radius rod, the arms of the U-shaped member extending through said plate and secured thereto and an upwardly extending nut engaging flange carried by the plate and interposed between the nut and the radius rod.

3. In a radius rod support, a recessed plate adapted for disposition in engaging relation upon the under side of the radius rod, a forwardly presented lug upon the plate adapted for nut-locking engagement with the adjacent perch-nut, and means engaging the ends of the plate for rigidly clamping the same upon the radius rod.

4. In a radius rod support, a recessed plate adapted for disposition in engaging relation upon the under side of the radius rod, a forwardly presented lug upon the plate having a recessed front face for nut-locking engagement with the adjacent perch-nut and means engaging the ends of the plate for rigidly clamping the same upon the radius rod.

In testimony whereof we have signed our names to this specification.

MERT C. SKAGGS.
FLOYD HAMMOCK.